US005335886A

United States Patent [19]
Greenhalgh

[11] Patent Number: 5,335,886
[45] Date of Patent: Aug. 9, 1994

[54] LIFT ENHANCEMENT DEVICE

[75] Inventor: Samuel Greenhalgh, Doylestown, Pa.

[73] Assignee: The United States of America as represented by the Seceretary of the Navy, Washington, D.C.

[21] Appl. No.: 67,763

[22] Filed: May 26, 1993

Related U.S. Application Data

[63] Continuation-in-part of Ser. No. 830,206, Jan. 30, 1992, Pat. No. 5,226,618.

[51] Int. Cl.⁵ ............................................. B64C 23/00
[52] U.S. Cl. ..................................... 244/213; 244/215
[58] Field of Search ............ 244/123, 213, 215, 153 A, 244/203, 204, 201

[56] References Cited

U.S. PATENT DOCUMENTS

| | | | |
|---|---|---|---|
| 1,846,146 | 2/1932 | Rocheville | 244/219 |
| 2,368,702 | 2/1945 | Bourne | 244/130 |
| 3,944,170 | 3/1976 | Musgrove | 244/219 |
| 4,667,898 | 5/1987 | Greenhalgh | 244/219 |
| 4,779,825 | 10/1988 | Sams | 244/153 A |
| 4,867,396 | 9/1989 | Wainfan | 244/198 |

Primary Examiner—Galen L. Barefoot
Attorney, Agent, or Firm—James V. Tura; James B. Bechtel; Susan E. Verona

[57] ABSTRACT

A lift enhancing device for a solid wing is disclosed. A solid wing with a swept leading edge and unswept trailing edge has a rectangular flap attached along the trailing edge. The flap can be a single segment or can be a plurality of segments joined at contiguous edges. The flap oscillates during air movement and enhances the lift produced.

5 Claims, 8 Drawing Sheets

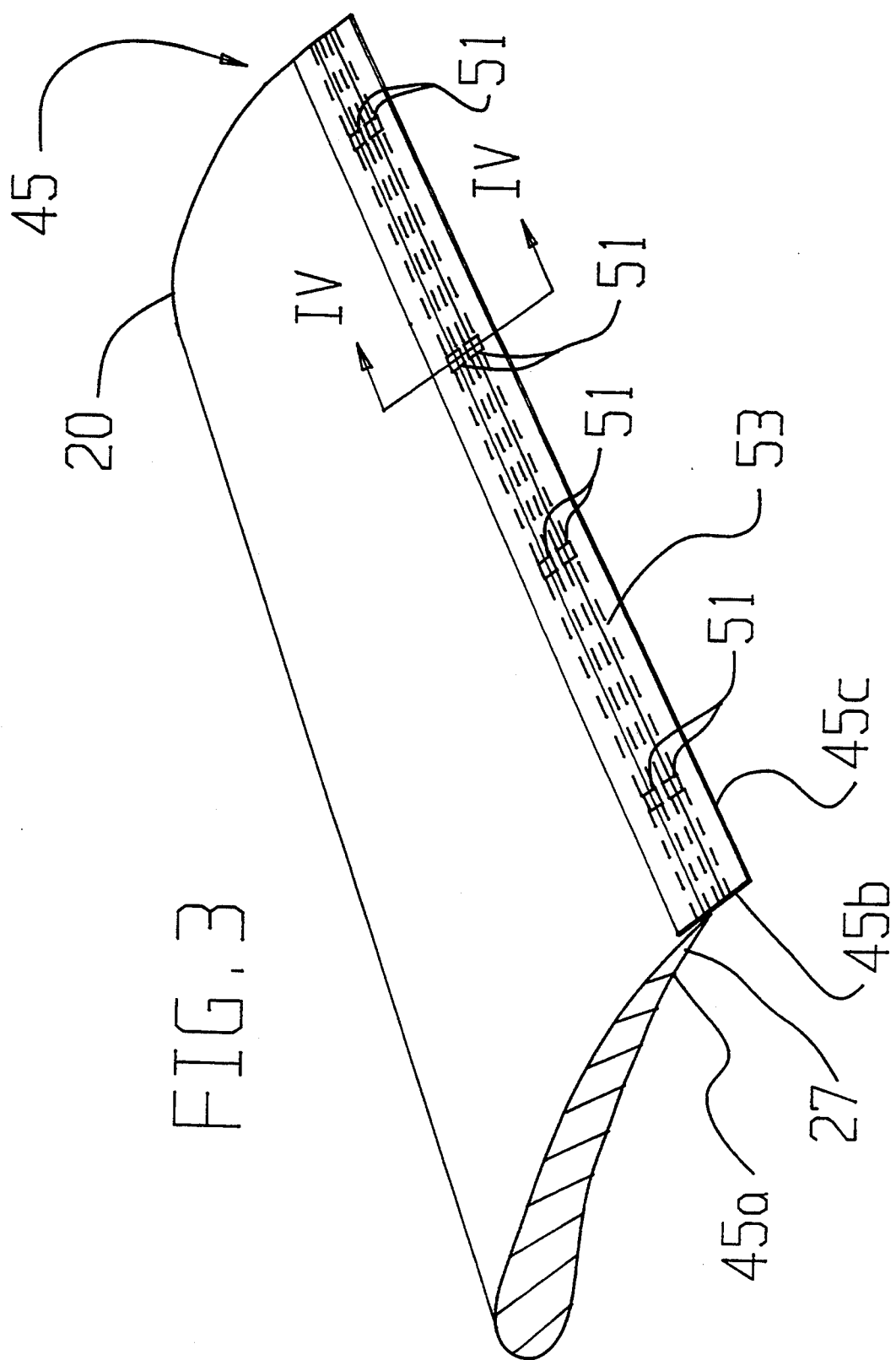

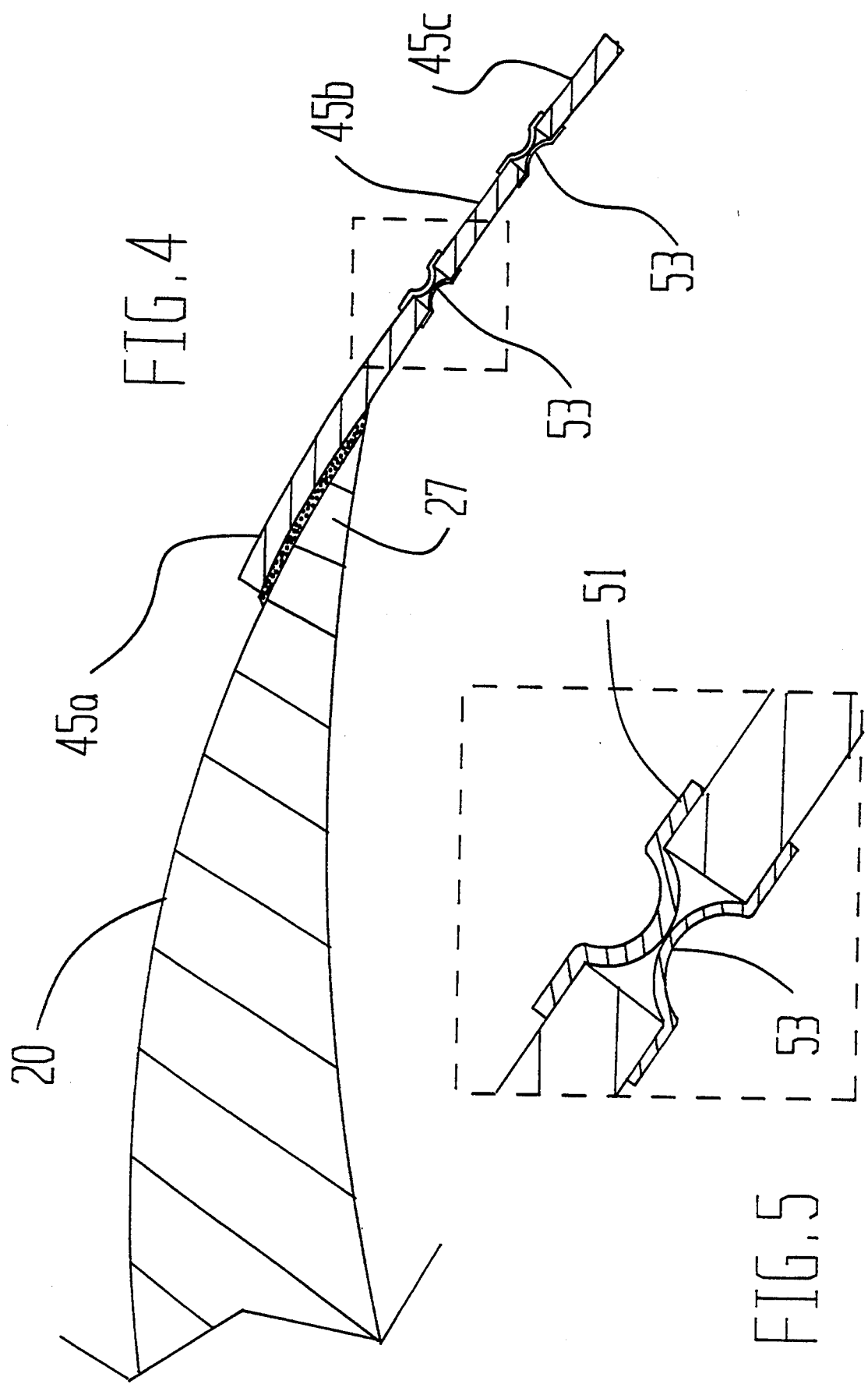

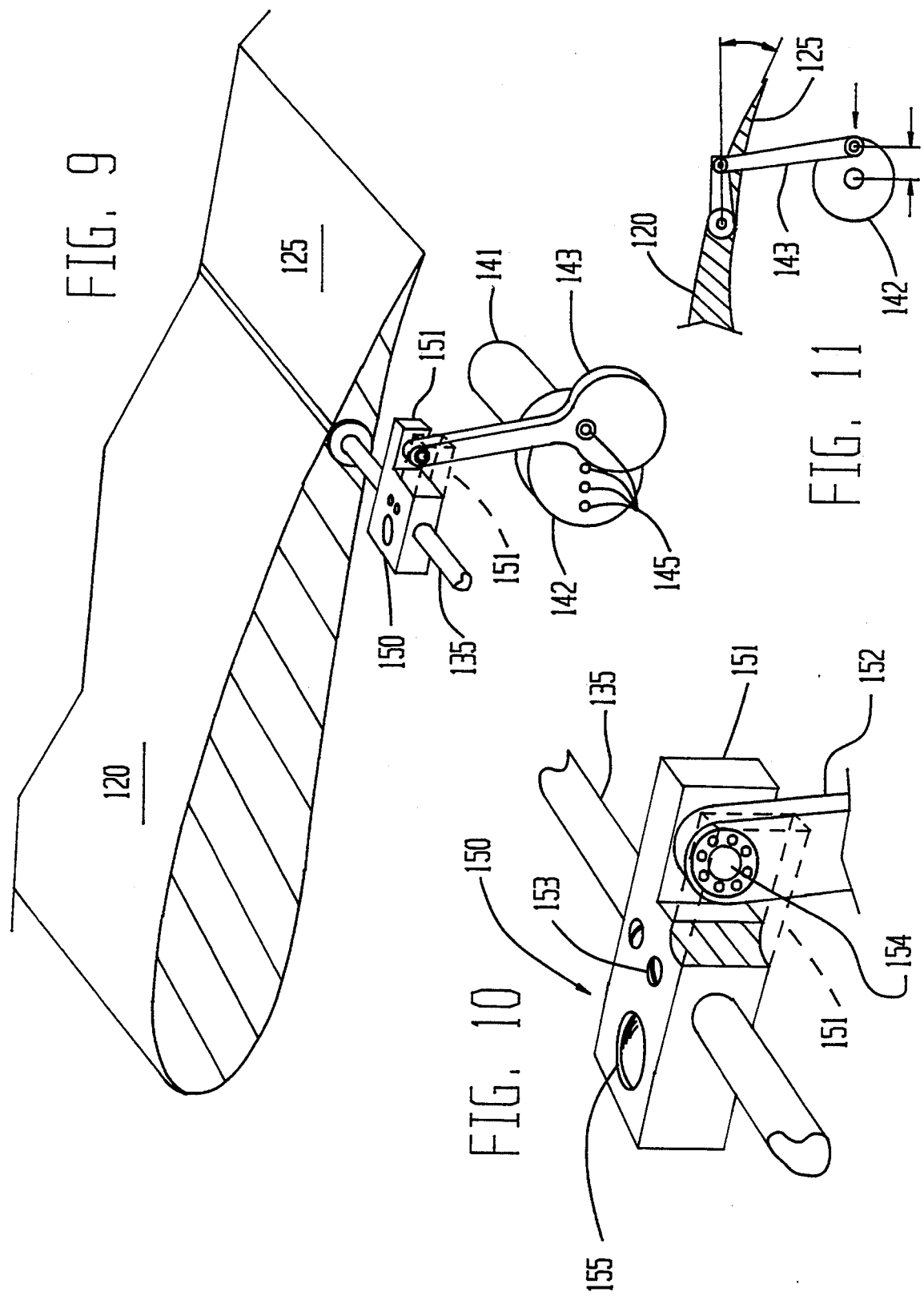

LIFT ENHANCEMENT DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This is a continuation-in-part application of U.S. Ser. No. 07/830,206 filed Jan. 30, 1992, now U.S. Pat. No. 5,2266,618. This invention relates to improved lifting capabilities of a solid wing that has a membrane trailing edge means flexibly attached.

Over the past few years, there has been a great deal of interest in unsteady aerodynamics in several areas of air vehicle research from fighter aircraft to missile dynamics. Generally, the research falls into two basic categories: unsteady effects that produce destructive vibrational effects with detrimental stability and control, and those effects that may be used in a positive way. Aerodynamic research involving wings and airfoils continues to search for ways to improve the lifting characterestics of airfoils by whatever means for purposes of improved flight parameters, larger payload capability or better handling characteristics at predetermined velocities. Towards this end, U.S. Pat. No. 4,867,396 to Barnaby S. Wainfan, issued on Sep. 19, 1989, and assigned to the Lockheed Corporation discloses that it is known to fixedly attach a small flap-like device to the trailing edge of an airfoil to improve the coefficient of lift and reduce the coefficient of drag. The flap is a flat, single plate-like member having a length of between 0.5% to 1.50% of the chord of the airfoil and is fixedly positioned at a downward angle to the chord of between 5° and 25°. Preferably, the length of the flap is approximately 1% of the chord and the preferred angle to the chord is 20°. It has been found that the above change in the aerodynamic characteristics provides an overall increase in fuel efficiency. However, this improvement still falls short of providing the dramatic improvement in lift characteristics that is obtained by the present invention.

SUMMARY OF THE INVENTION

It is therefore an object of the present invention to improve the lifting capabilities of a wing;

It is a further object of the present invention to improve the lifting capabilities of a wing at high angles of attack;

It is a still further object of the present invention to improve the lifting capabilities of a wing by flexibly attaching a flap to the trailing edge of the wing so as to allow it to move in a limit cycle oscillation.

These and other objects and many attendant advantages of the present invention are obtained where an oscillating metal membrane flap is flexibly attached, as for instance with double-sided tape, to the trailing edge of a wing. In one embodiment, the flap can be a single segment. In another embodiment, the flap can have a plurality of segments, joined at hinge joints. Greater lift for the wing is produced when the oscillating flap is attached.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 3 shows a perspective view of an alternative embodiment of a semi-span wing with a segmented membrane trailing edge flap attached;

FIG. 4 shows a cross-sectional view taken along lines IV-IV of FIG. 3;

FIG. 5 shows an isolated and enlarged view of the attachment means joining one segment to the trailing edge;

FIG. 9 shows a fragmentary and expanded perspective view of the wing of FIG. 8, showing the means of attachment of the trailing edge flap to the wing;

FIG. 10 shows an isolated view of the connection of the power means of FIG. 8 to the solid rod; and FIG. 11 shows a side view of the connection means of FIG. 10.

DESCRIPTION OF THE PREFERRED EMBODIMENT

Figure 1:
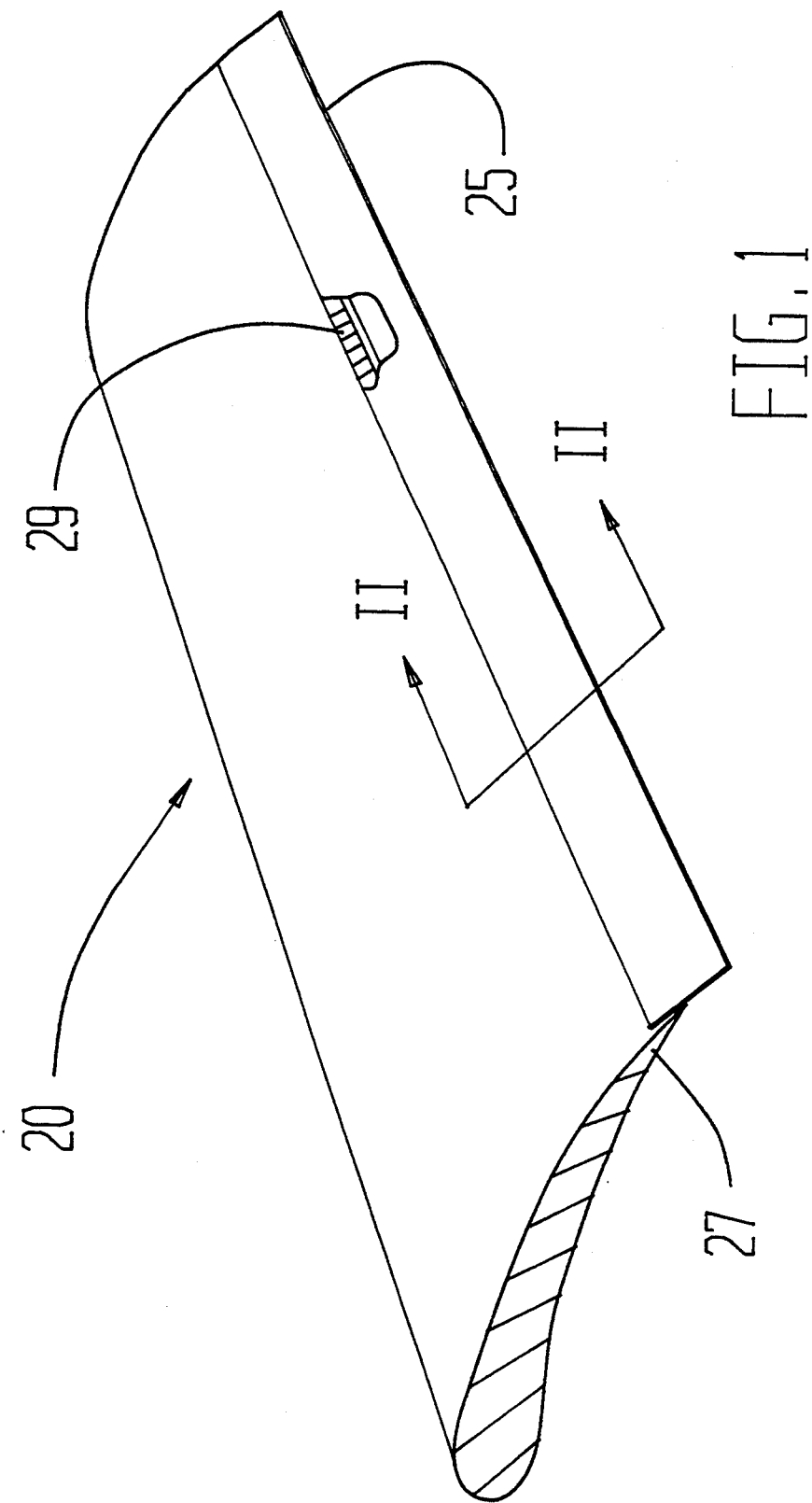
FIG. 1 shows a perspective view of a membrane trailing edge flap attached to the trailing edge of a semi-span wing.
Figure 2:
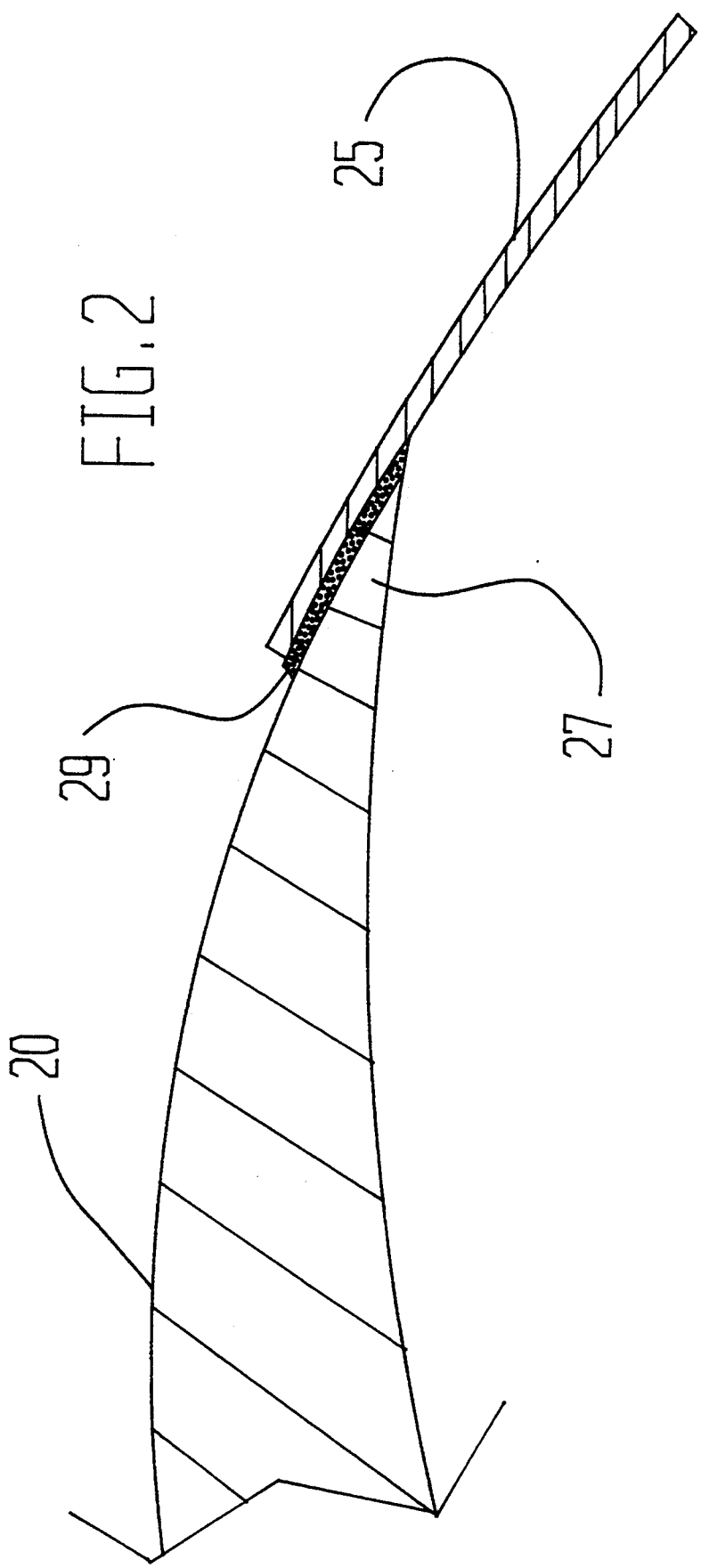
FIG. 2 shows a cross-sectional view taken along lines II—II of FIG. 1.

Referring now to the drawings, wherein like reference characters designate like or corresponding parts throughout the several views, there is illustrated in FIG. 1 a perspective view of a single-segment membrane trailing edge flap 25 attached to the top surface of the trailing edge 27 of a semi-span wing 20 by use of adhesive means such as double-sided tape 29. A portion of flap 25 has been cut-away, as at 29, to better illustrate the amount of surface of trailing edge 27 that is used to provide bonding area between the flap and the edge. FIG. 2 shows an enlarged, cross-sectional view of the bonding area as taken along lines II—II of FIG. 1.

The solid wing used for testing purposes consisted of a mahogany three-foot, semi-span tapered wing with a twelve inch root chord and an eight inch tip chord, a section built to be identical to the NACA $63_3$-018 design. In this embodiment, flap 25 is made from 1 mil thick stainless steel membrane and double-sided tape 29 can be any commonly known ½ mil, mylar adhesive tape. First, tape 29 is secured to the bonding area along the periphery of trailing edge 27, then a proportionate edge of flap 25 is placed onto the upper, adhesive edge and then pressure is applied to form the bond between all three. In operation, flap 25 reacts to aerodynamic forces and oscillates in an organized pattern. A lift component enhancement is realized, as will be explained more fully in FIG. 6.

FIG. 3 shows a perspective view of a semi-span wing 20 with alternate embodiment flap 45 attached to adhesive means 29. FIG. 4 shows an enlarged, cross-section view of the trailing edge taken along lines IV—IV of FIG. 3. As an alternate embodiment, flap 45 can have multiple, width-wise segments 45a, 45b and 45c. All three segments are made from 2 mil thick stainless steel and are as long as trailing 27 and one embodiment has segment 45a being 2 inches wide with a 1 inch bonding portion while segments 45b and 45c are each ¼ wide. There are 3 mil gaps between the edges of the segments and each gap is covered on the top and the bottom by tape to produce flexible joints or hinge-points. The taped joints introduce span-wise lines of reduced bending stiffness into segmented flap 45.

FIG. 5 shows an enlarged view of the joint between the edges of 45a and 45b, as taken from FIG. 4. As mentioned, the flexible joints behave somewhat like a hinged joint, producing a reduced bending stiffness at the gaps between flap segments. This reduction in the bending stiffness at these selected locations allows flap 45 to interact with aerodynamic forces.

As seen in FIG. 3, small sections 51 of fiberglass reinforced packing tape (where several rows of fiberglass strands (not shown) are manufactured into the lengthwise run of the tape) are arranged at spaced intervals on the top surface of the segments to provide tensile strength and flexibility. Sections 51 are bonded to the surfaces to have the fiberglass strands oriented in the streamwise direction, i.e. spanning the 3 mil gaps between segments. Referring again to FIG. 5, it can be seen that tape 53, that is used on the underside to join segments 45a, b and c, is of a standard form of cellophane tape, as known in the industry. A strip of tape 53 is used at each hinge point and covers the gap from one end to the other. As can be seen, the two portions of tape, 51 and 53, are pushed into the gap until they make contact with each other to reduce their collective thicknesses. (As is known, the bending moment of inertia is related to the thickness cubed, so reducing the combined tape thickness by four, for example, would reduce the bending stiffness by a factor of sixty-four. This produces a joint between segments that has some amount of tensile strength and is sealed but still retains a certain amount of bending stiffness. This localized bending stiffness has been found to be up to two orders of magnitude (100x smaller) less than the 2 mil stainless steel used to make the flap. This reduced bending stiffness allows flap 45 to oscillate in a self-induced limit cycle oscillation.

Figure 6:
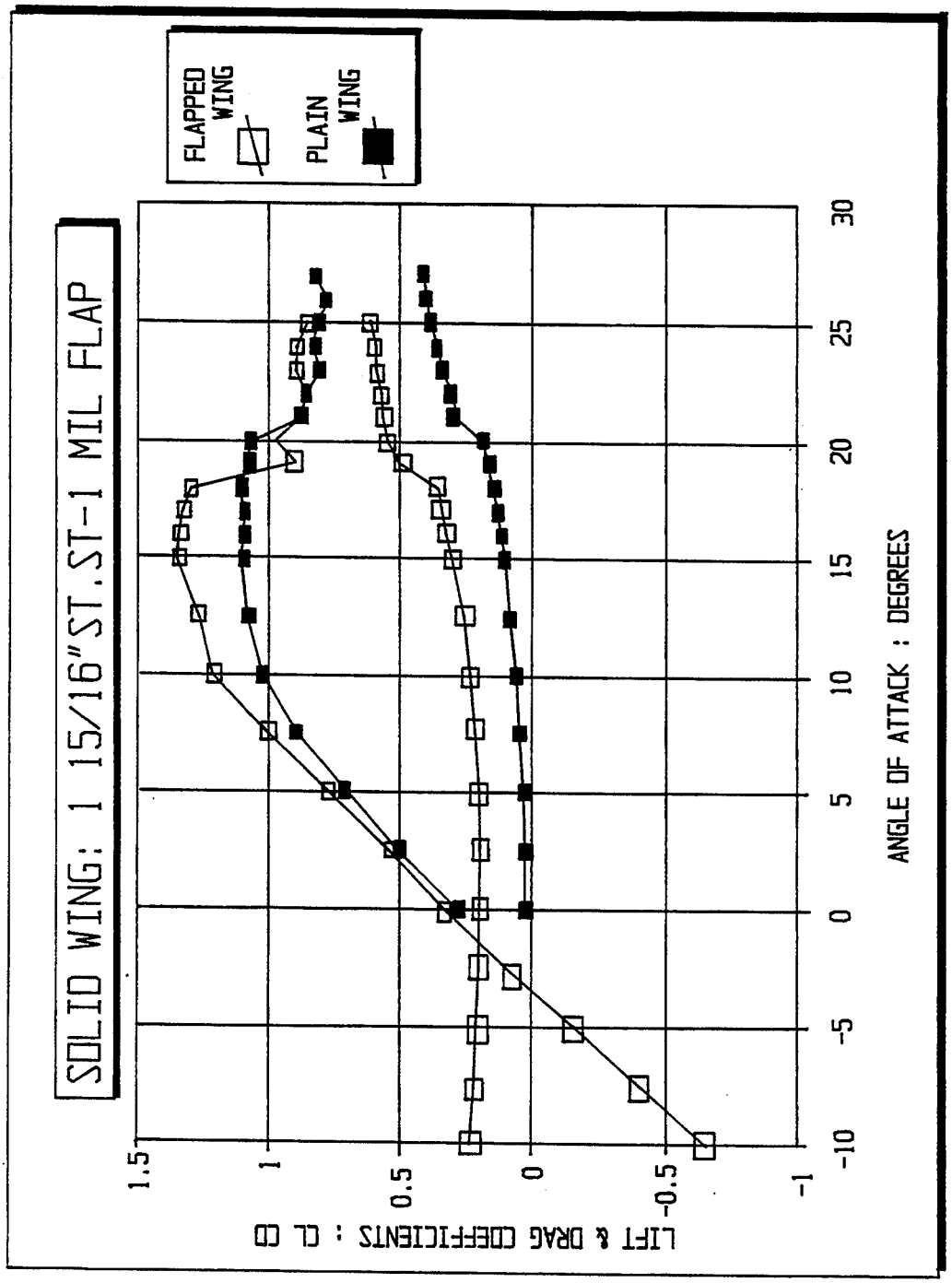
FIG. 6 shows a graph of both the coefficient of lift ($C_L$) and the coefficient of drag ($C_D$) plotted against angle of attack ($\alpha$) for the wing of FIG. 3.
Figure 7:
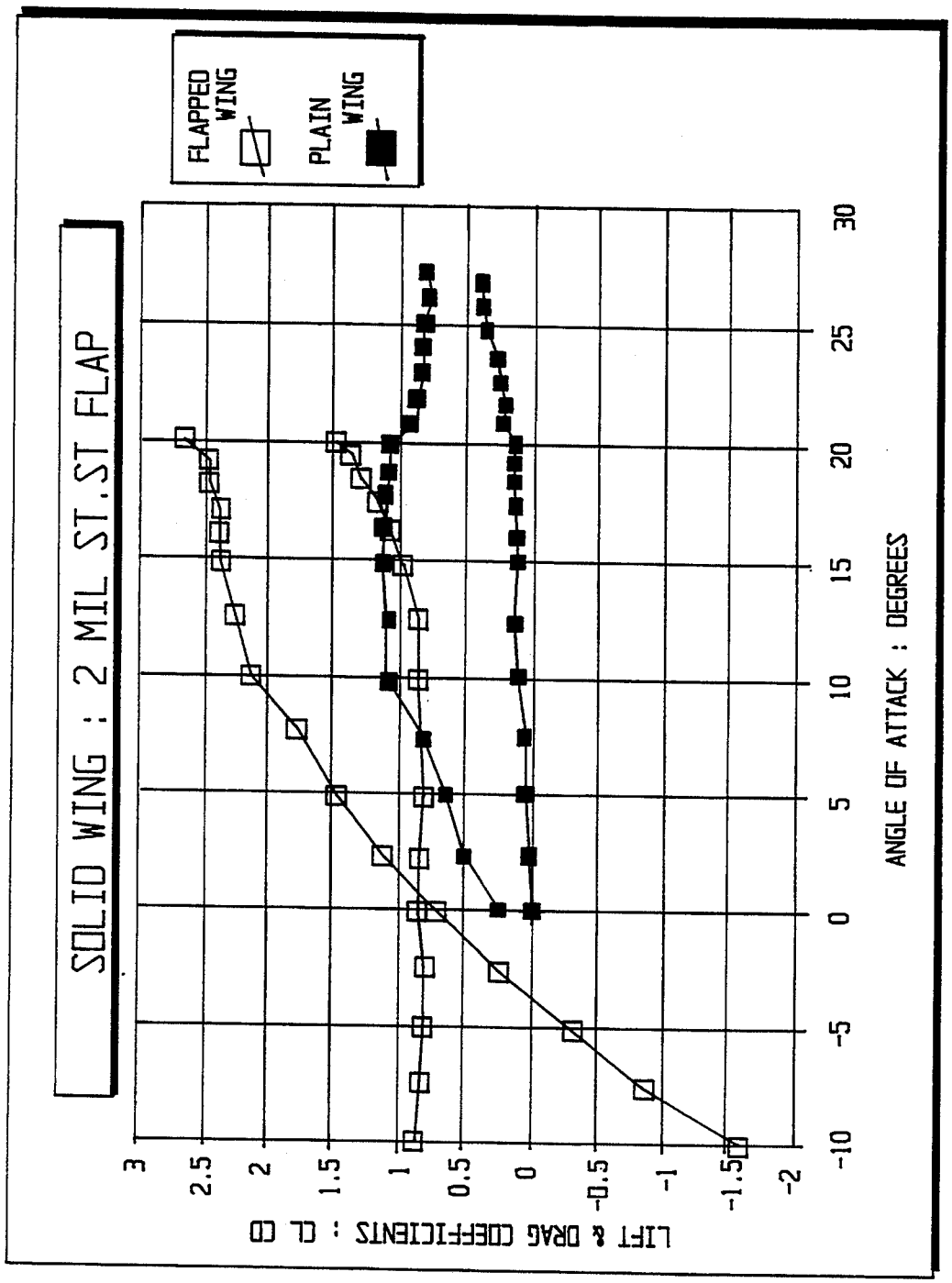
FIG. 7 shows a graph of both the coefficient of lift ($C_L$) and the coefficient of drag ($C_D$) plotted against the angle of attack ($\alpha$) for the wing of FIG. 3.

FIGS. 6 and 7 are four curve plots that show a comparison of the lift and drag coefficients versus angle of attack for both the single-flapped embodiment versus a plain wing (FIG. 6) and the segmented version versus a plain wing (FIG. 7). In both plots, the darkened symbols are for the plain, unflapped wing and the hollow symbols are for the flapped wing. In both cases, these plots show that the flapped wings produce more lift than the plain wing. However, also in both cases, the flapped wings also produce more drag than the plain wings.

Figure 8:
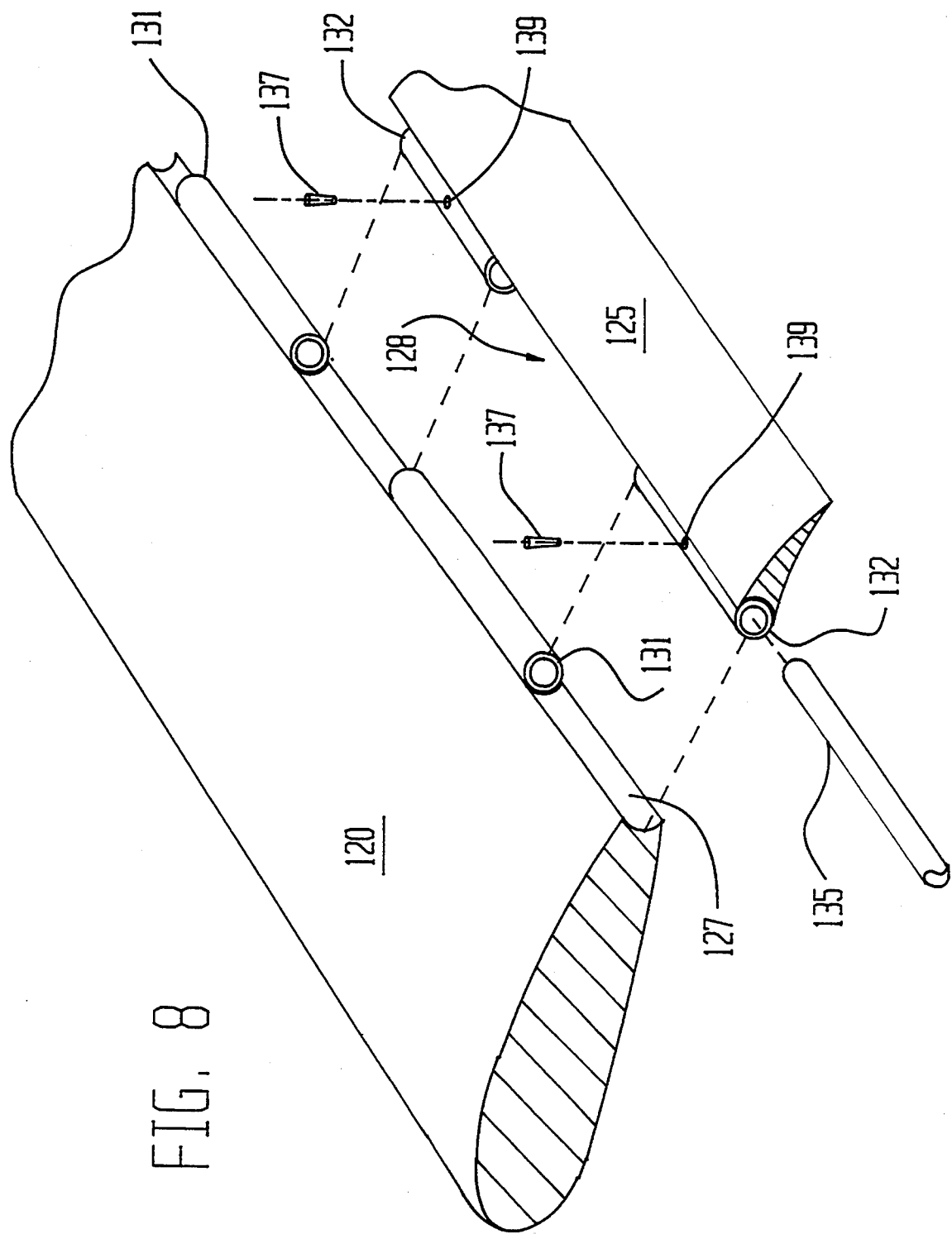
FIG. 8 shows a fragmentary perspective view of a solid wing with power means attached to drive a solid flap.

FIGS. 8 through 11 show yet another embodiment of the flapped wing. FIG. 8 shows a partially broken-away, perspective view of a solid wing 120 having a mechanically driven flap 125 attached to oscillate about a hinge line. As seen in FIG. 9, wing 120 has a plurality of hinge tubes 131 fixed, as by gluing, to its trailing edge 127. Flap 125 has a plurality of hinge tubes 132 fixed, as by gluing, to its leading edge 128 in such a spaced apart relationship such that when flap 125 is brought adjacent to the trailing edge of wing 120, hinge tubes 132 fit in-between tubes 131 to form a uniform centerline therein and accommodate drive rod 135. As shown in FIG. 9, drive rod 135 is connected to hinge tubes 132, and hence, to flap 125, through the use of tapered drive pins 137. After rod 135 is fitted into hinge tubes 131, 132, pins 137 are secured through openings 139 into rod 135.

An electric motor 141 (as shown in FIG. 8) is connected to drive rod 135 to supply power to the mechanism. A connecting link 143 is, at one end, adjustably fixed, as at one of a plurality of locations 145, to crank plate 142, and, at the other end, to a lever 150. FIG. 10 shows an enlarged, isolated view of lever 150 with one of side arms 151 broken away to show the bearings 152 at the pin joint 154. By changing the radial location or position at the lower end of connecting link 143 relative to the center of rotation of crank plate 142, the displacement angle of flap 125 can be varied (see FIG. 11). In FIG. 10, it can be seen that two set screws 153 are used to fix the position of lever 150 relative to drive rod 135. Screws 153 allow flap 125 to be rotated or turned relative to the driving forces and therefore set with either a positive or negative bias. Additionally, a lead weight 155 is set into the end of lever 150 to allow for the balancing of inertial forces of flap 125 and the connecting link 142.

Finally, while the oscillating flapped wing has been described with reference to a particular embodiment, it should be understood that the embodiment is merely illustrative as there are numerous variations and modifications, such as shape and thickness of the flap, which may be made by those skilled in the art. Thus, the invention is to be construed as being limited only by the spirit and scope of the appended claims.

I claim:

1. A solid, semi-span wing that produces increased lift comprising:
    an airfoil section wing having leading and trailing edges;
    adhesive means affixed to the upper surface of the trailing edge; and
    flap means comprised of a single sheet of stainless steel shim stock of predetermined length, width and thickness attached to said adhesive means wherein both sides of said single sheet are exposed to air flow and the sheet oscillates in a limit cycle due to the aerodynamic forces imposed hereon.

2. A wing as described in claim 1 wherein said adhesive means comprises a dual-sided tape.

3. A wing as described in claim 1 wherein said flap means comprises a plurality of flap segments of stainless steel shim stock attached contiguously edge-to-edge, by joinder means thereby forming predetermined hinge lines.

4. A wing as described in claim 3 wherein the bending moment of inertia at the hinge lines is less than that of a nonsegmented flap.

5. A wing as described in claim 4 wherein the bending moment of inertia at the hinge lines is approximately two orders of magnitude less than that of a nonsegmented flap.

* * * * *